Dec. 18, 1962 T. S. GATES 3,068,759
GEAR FINISHING MACHINE
Filed Nov. 25, 1957 3 Sheets-Sheet 1

INVENTOR.
THOMAS S. GATES
BY Whittemore
Hulbert & Belknap
ATTORNEYS

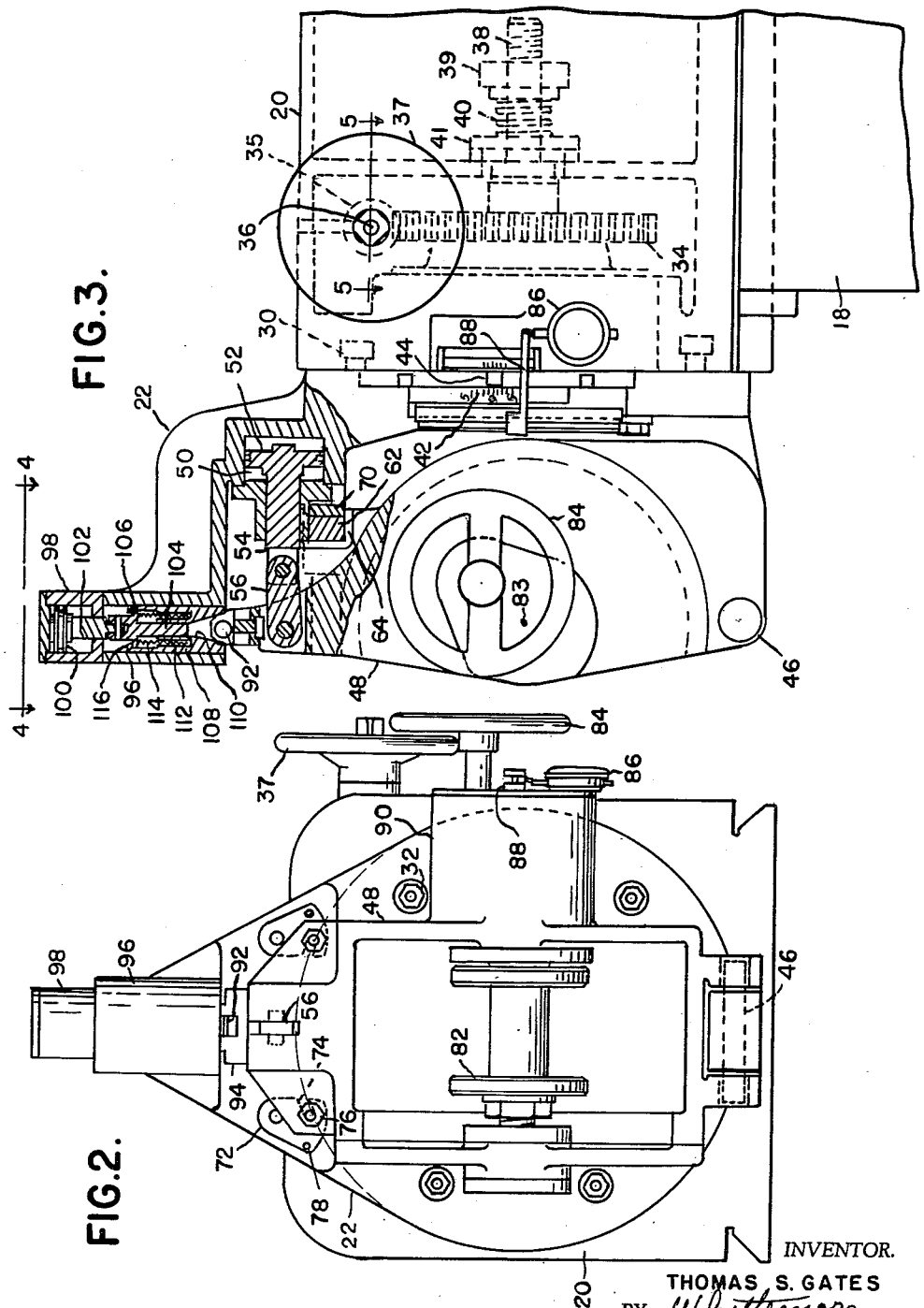

Dec. 18, 1962 T. S. GATES 3,068,759
GEAR FINISHING MACHINE
Filed Nov. 25, 1957 3 Sheets-Sheet 3
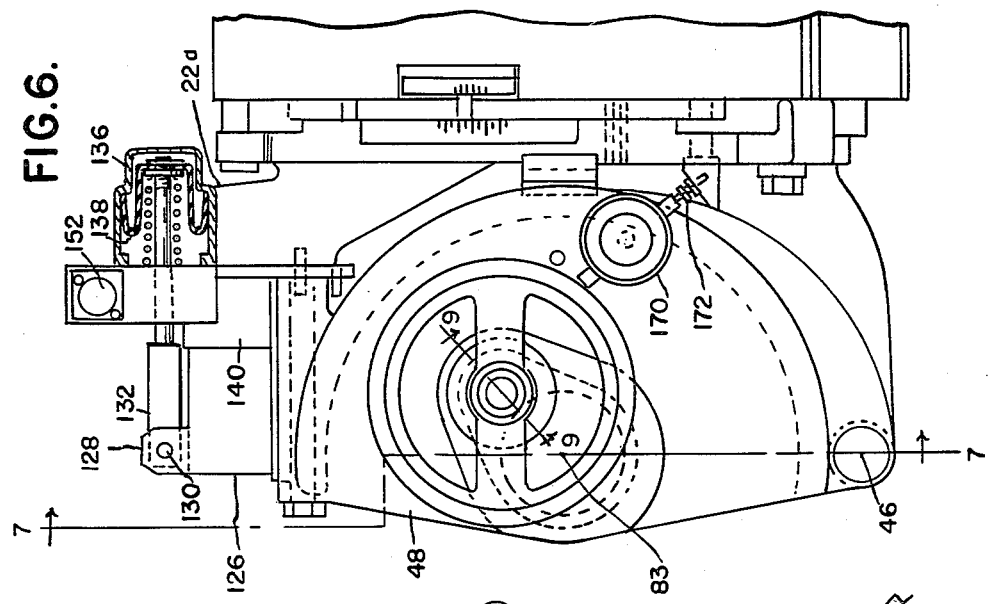
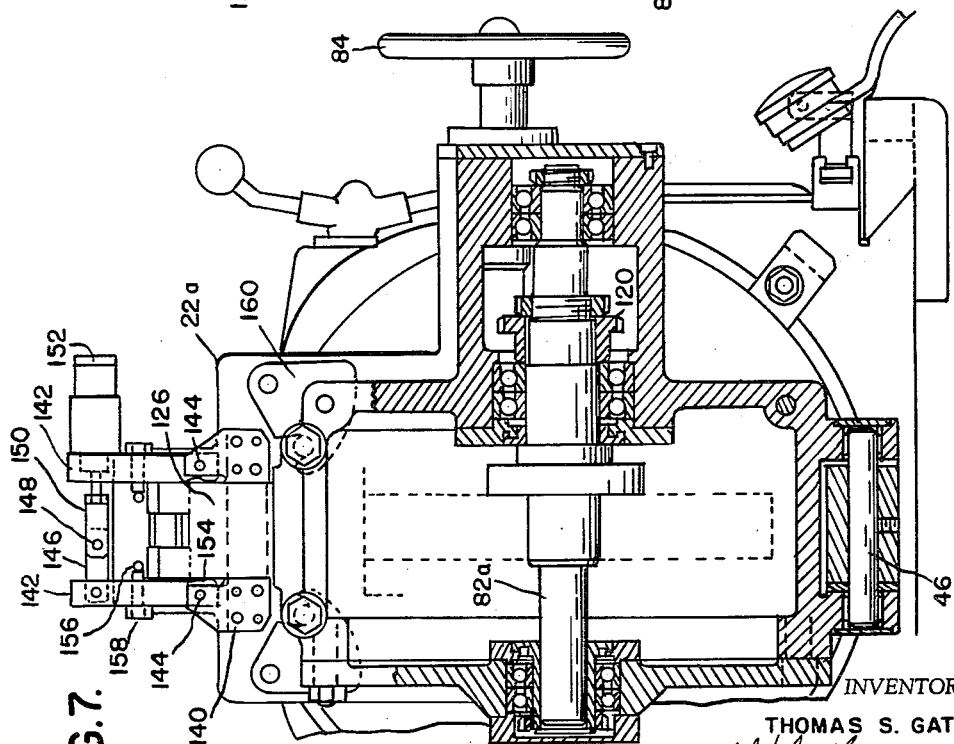
INVENTOR.
THOMAS S. GATES
BY Whittemore,
Hulbert & Belknap
ATTORNEYS

United States Patent Office 3,068,759
Patented Dec. 18, 1962

3,068,759
GEAR FINISHING MACHINE
Thomas S. Gates, Grosse Pointe Woods, Mich., assignor to National Broach & Machine Company, Detroit, Mich., a corporation of Michigan
Filed Nov. 25, 1957, Ser. No. 698,695
9 Claims. (Cl. 90—1.6)

The present invention relates to a gear finishing machine.

It is an object of the present invention to provide a machine for finishing gears by an operation in which the gear is rotated in mesh, preferably at crossed axes, with a gear-like tool while maintained in predetermined controlled relatively light radial pressure therewith.

It is a further object of the present invention to provide a machine for finishing gears as described in the preceding paragraph in which the means for controlling the radial pressure is operable to effect a radial feed as material is removed from the teeth of a work gear.

It is a further object of the present invention to provide a machine as defined in the second paragraph above in which means are provided for locking the gear and gear-like tool at predetermined radial distance determined by initial predetermined relatively light radial pressure.

More specifically, it is an object of the present invention to provide a gear finishing machine including relatively movable work and tool supports in which one of the supports is pivoted for angular movement about an axis so located with respect to the axis of the spindle carried thereby that angular movement thereof results in substantially radial relative movement between the gear and tool.

It is a further object of the present invention to provide a machine as described in the preceding paragraph in which the axis of the pivot mounting of the support is so located as to minimize the gravitational torque of the pivoted structure.

Other objects and features of the invention will become apparent as the description proceeds, especially when taken in conjunction with the accompanying drawings, illustrating preferred embodiments of the invention, wherein:

FIGURE 2 is a front elevational view of the tool supporting structure of the machine.

FIGURE 3 is a fragmentary side elevational view of the tool supporting structure with parts in section.

FIGURE 6 is a fragmentary side elevational view of a somewhat modified tool supporting structure.

FIGURE 7 is a fragmentary section on the line 7—7, FIGURE 6.

Figure 1:
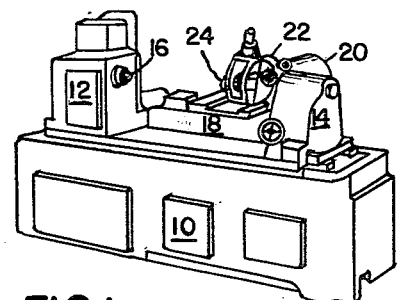
FIGURE 1 is a perspective view of a gear finishing machine embodying the present invention.

Referring now to FIGURE 1 there is illustrated a gear finishing machine comprising a base 10, work support structure comprising stocks 12 and 14 including rotary spindles one of which is indicated at 16 for supporting a relatively heavy work gear. Mounted on the base 10 is tool supporting structure which includes a carriage 18 movable horizontally parallel to the axes of a work gear supported between the stocks 12 and 14, and a slide 20 movable horizontally on the carriage toward and away from the axis of a work gear supported between the stocks 12 and 14. Located at the front end of the slide 20 is a tool support housing indicated generally at 22 to which is pivoted a tool support 48.

The foregoing description is in general terms and is primarily for the purpose of pointing out the utility of the tool supporting structure, which will now be described in detail.

While the machine illustrated may be useful in a gear finishing operation known as shaving, in which a gear-like tool is provided with cutting edges in the flanks of its teeth, it is intended primarily for use in gear honing. In this operation a gear-like tool is formed of a hard but slightly yieldable and highly resilient plastic material, preferably an epoxy resin having abrasive grains embedded therein. In finishing gears with an abrasive hone it is desirable in many operations to provide a relatively light and accurately controlled radial pressure between the gear and hone as the parts are rotated in mesh and preferably traversed in a plane parallel to the axes of both. Inasmuch as the machine parts which support the gear or the hone for rotation are necessarily relatively heavy, in accordance with the present invention, the movable support is pivoted for angular movement about an axis located in a position to minimize gravitational torque of the relatively heavy support.

Referring first to the embodiment of the invention illustrated in FIGURES 2–5, the forward portion of the slide 20 is illustrated as carrying the support housing 22 for angular adjustment about a horizontal axis determined by the circular T-slot 30, the housing being adapted to be clamped in adjusted position by nuts 32 engageable with bolts having their heads received within the T-slot.

The gear finishing operation is preferably carried out with the axes of the gear and tool crossed in space at a small angle as for example between three and twenty degrees, and for this purpose means are provided for effecting accurate angular adjustment of the tool support housing 22. This means comprises a worm gear 34 fixed to the tool support housing and in mesh with a worm 35 carried by a shaft 36 to which is fixed an operating hand wheel 37. Extending rearwardly from the tool support housing 22 is a threaded projection 38 carrying a nut 39 engaging a compression spring 40 which applies frictional pressure to a disc 41 for opposing rotation of the tool support housing 22 when the clamping nuts 32 are released for effecting angular adjustment thereof. The exact angular setting of the tool support housing is determined by the difference in helix angle between the gear and tool and for determining the angularity of the setting, the tool support housing is provided with a graduated scale 42 cooperable with a pointer 44 carried by the tool slide 20. The tool support housing 22 is provided adjacent its lower portion with pivot means indicated generally at 46 by means of which a tool support 48 is mounted for angular movement about the axis of the pivot support 46. Formed within the tool support housing 22 is a cylinder 50 receiving a piston 52 having a piston rod 54 connected by a link 56 to the upper end of the tool support 48.

Means are provided for guiding the tool support 48 during its angular movement and this means comprises a pair of angular plates 58 each having one portion 60 extending parallel to the direction of movement of the tool support 48 to which is fastened a hardened wear plate 62 slidably engageable by a surface 64 on an upwardly extending projection 66 formed on the tool support 48 during angular movement thereof. It will be appreciated that the tool support 48 is thus guided by a pair of such wear plates.

Means are also provided for locking the pivoted tool support in adjusted centralized position. This means comprises a pair of thickness gauges 70 mounted on pivot supports 72 and having slots 74 for receiving clamping screws 76. The thickness gauges have actuating pins 78 projecting outwardly therefrom by means of which they may be moved into and out of gauging position. The thickness gauges operate as such between legs 80 of the angular plates 58 and projection 66 on the tool support.

It will be observed that the axis of the pivot support 46 is in intermediate gauged position of the tool support 48 directly beneath the axis 83 of the tool supporting spindle 82 thereof. Accordingly, while the tool support 48 and the tool carried thereby may be relatively heavy, the gravitational torque of this structure is minimized so that accurate control of the radial pressure between a gear and tool may be maintained.

Inasmuch as the work gear for which this machine is designed may be relatively massive, it sometimes becomes necessary to effect slight rotation of a relatively heavy tool carried by the tool spindle 82 to bring it into properly registering relationship for meshing with the work gear. This is accomplished by a hand wheel 84 operable through gearing as will be described in more detail in conjunction with the second embodiment of the invention, to rotate the tool.

It will be observed from the foreging that if fluid pressure is applied to the cylinder 50 to the right of the piston 52 as seen in FIGURE 3, this will have the effect of urging the tool support 48 counterclockwise about the axis of its pivot support 46. Due to the fact that the pivot mounting 46 is parallel to and spaced substantially from the axis 83 of the tool spindle 82, the gravitational effect of the tool and its support is minimized and the radial pressure between a tool carried by the spindle 82 and a work gear on the work support may be accurately controlled.

It may be mentioned at this time that excellent results are obtained when the source of fluid pressure supplied to the cylinder 50 is air pressure. While it is recognized that air is an elastic medium, the excellent results obtained are believed due to the fact that inertia of the tool and its support opposes vibrational movement. Alternatively of course, hydraulic pressure may be applied.

Means may be provided for obtaining an accurate crossed axes setting. The approximate crossed axes setting, as previously described, is indicated by the graduated scale 42 and the pointer 44. However, in the gear finishing operation a trial cut may be taken which will indicate that an extremely small adjustment is required in the angular setting of the tool support with a corresponding small change in the crossed axes setting. For this purpose an indicator 86 is mounted on the slide 20 and an operating finger 88 extends rearwardly from the angularly adjustable tool support and may be adjustable thereon to a position for cooperation with the indicator 86. With the actuating finger 88 in engagement with the button of the dial indicator, angular adjustment of the tool support 22 causes movement of the finger 88 and this movement results in movement of the indicator of the gauge 86.

While the operation above described comprises movement of the tool during the machining operation, it is desirable in some cases to bring the gear and tool into initial mesh under predetermined relatively light radial pressure and to lock up the parts so that no additional radial movement takes place during the subsequent machining operation. This of course requires rigid locking means capable of locking the tool support 49 in whatever position of adjustment it happens to reach when the tool carried thereby is suitably meshed with the work gear. This means is best illustrated in FIGURES 2 and 3 where it will be observed that a locating pin 92 is mounted on an upwardly extending rigid member 94 secured to the top of the tool support 48. The tool support housing 22 is provided with a hollow guide portion 96 at the upper end of which is mounted a fluid cylinder 98 containing a piston 100 having a piston rod 102 connected to an actuator 104. The actuator 104 has oppositely projecting ears 106 for a purpose which will presently be described. Vertically slidable in the tubular portion 96 of the tool support housing are a pair of wedge locking elements 108 each of which at its lower end is provided with an inclined wedging surface 110 engageable at opposite sides of the locating pin 92. The elements 108 also include recesses 112 receiving compression springs 114 the upper ends of which engage under the ears 106. The elements 108 at their upper ends include inwardly extending ears 116 overlying the ears 106 of the actuator 104.

From the foregoing it will be observed that the locating mechanism is operable to effect rigid clamping of the tool support 48 in whatever position of adjustment it reaches when pressure is applied to the cylinder 50. Downward movement of the actuator releases the elements and the spring means applies yielding pressure to the wedge locking elements 108 and each is thus movable downwardly to a position determined by engagement between its inclined surface 110 and the adjacent side of the locating pin 92. The angle of inclination of the surface 110 is a wedge locking angle.

When pressure is reversed in the cylinder 98, upward movement of the piston 100 effects positive withdrawal of the wedge locking elements as a result of direct engagement between ears 106 and 116.

Referring now to the embodiment of the invention illustrated in FIGURES 6–9, much of the structure disclosed therein is substantially the same and the description thereof will be omitted. However, in these figures the mechanism for effecting angular adjustment of the tool spindle here illustrated at 82a, comprises a gear 120 keyed or otherwise fixed to the tool spindle 82a. The hand wheel 84 is connected to a shaft 122 mounted for axial sliding movement and urged to the right to the position illustrated in FIGURE 9 by a spring 123. The shaft 122 at its inner end has a pinion 124 adapted to mesh with the gear 120 when the hand wheel 84 is pushed inwardly. Thus, when it is desired to effect small angular adjustment of the relatively heavy gear-like tool, the hand wheel 84 is pushed inwardly to mesh pinion 124 with the gear 120 and to thereby rotate the spindle 82a. When the hand wheel is released the gear and pinion are out of mesh. This is desirable since in this machine the work and tool spindles are rotated at relatively high speed, the rotation being the result of a direct drive of the work support spindle, the tool and its spindle being rotated through the meshed engagement between the gear and tool.

In this embodiment of the invention there is illustrated a somewhat different clamping means for effecting locking of the pivoted tool support 48 relative to the tool support housing, herein designated 22a.

This means comprises a block 126 having upward projections 128 carrying a pin 130 to which one end of a link 132 is connected. The link 132 connects through an opening in a housing 136 to a diaphragm 138 of a diaphragm cylinder unit of known type. This practically eliminates friction in the means for applying force to the tool support.

Connected to the tool housing 22a are a pair of brackets 140 to each of which is pivoted a clamping lever 142, the pivot mounting of the lever being indicated at 144. It will be observed that the levers are in effect bell crank levers having relatively long upwardly extending arms interconnected by a link 146 which is pivoted as indicated at 148 to an extension 150 of a piston rod 151 connected to a piston operating in the cylinder 152 which is carried by one of said levers. The short arm of the bell crank levers extends inwardly and terminates in wedging surfaces 154 engageable with opposite sides of the block 126. It will further be observed that in clamping the surfaces 154 move at a very small wedging angle with respect to the surfaces at opposite sides of the block 126.

When clamping pressure is released from the cylinder 152, the levers 142 are centered in released position by locating pin 156 engaged by dowels 158.

With the foregoing arrangement it will be observed that the clamping operation is effected without the application of force in either direction tending to disturb the radial pressure applied by the application of fluid pressure to the cylinder 138.

Thus it is possible to provide very rigid locking of the tool support in a fixed operating position by employing the wedge blocking members 108 of FIGURE 3, or to provide somewhat less positive locking by employing the friction lock levers 142 of FIGURE 7. The first may be preferred where due to run-out or other causes, it is desired to maintain operating pressure at higher values without yielding. On the other hand, where emphasis is on accurate control of very light pressures, the latter may be preferred, as having no influence on initial pressure and as being yieldable by slipping if dangerously high operating pressures develop.

In this embodiment of the invention thickness gauge plates 160 are provided whose operation is not substantially different from the gauge plates 70 described in connection with the first embodiment of the invention.

Figure 4A:
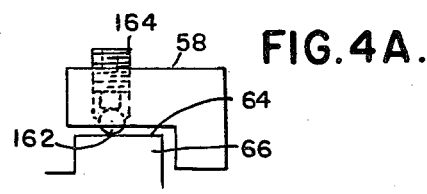
FIGURE 4A is a fragmentary sectional view of structure similar to that of FIGURE 4, showing a modification.
Figure 4:
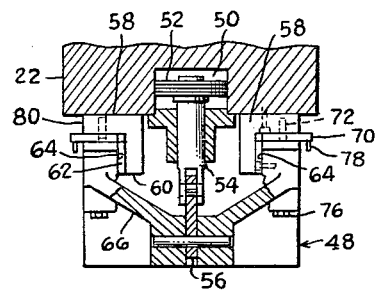
FIGURE 4 is a fragmentary view on the line 4—4, FIGURE 3.

As seen in FIGURE 4A, an additional device may be employed to further reduce the friction involved in movement of the tool support 48. Here the bracket 58 is provided with a ball 162 retained in a lipped recess by plug 164 engageable by surface 64 of the projection 66.

By a combination of features, it is thus possible to maintain very accurate pressure control at low values.

Figure 9:
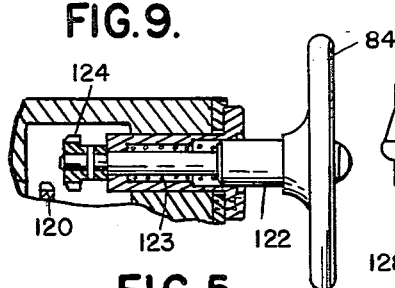
FIGURE 9 is a fragmentary section on the line 9—9, FIGURE 6.
Figure 8:
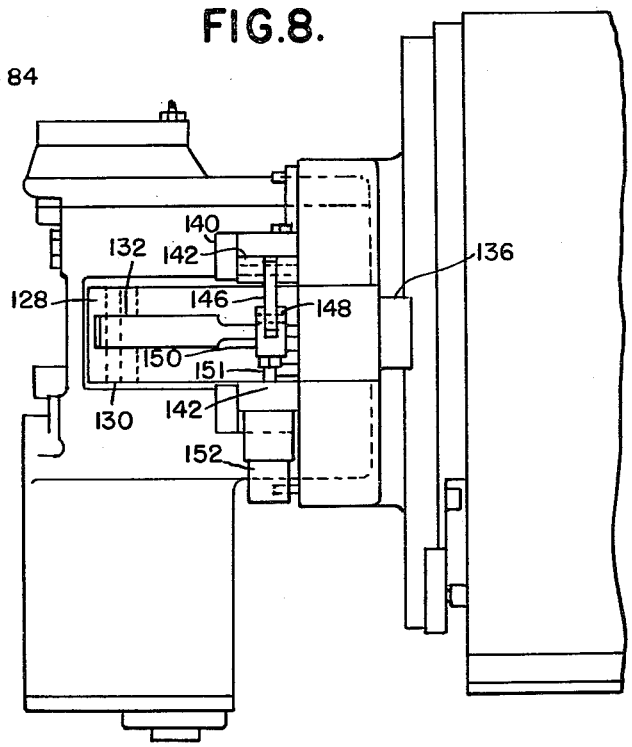
FIGURE 8 is a plan view of the structure shown in FIGURE 6.
Figure 5:
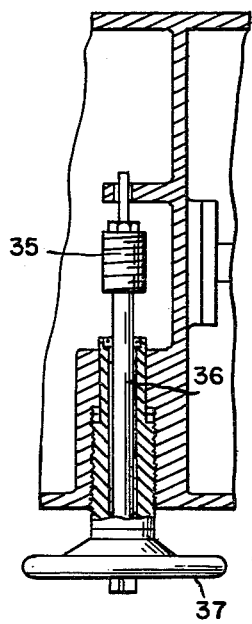
FIGURE 5 is a fragmentary sectional view on the line 5—5, FIGURE 3.

Referring again to the modified construction illustrated in FIGURES 7 and 8, means are provided for affording a substantially direct reading of stock removal which in turn permits angular movement of the tool support about its pivot axis 46. For this purpose a dial indicator 170 is provided on the tool support and its plunger is engageable with an adjustable but normally fixed abutment 172. It will be observed that the indicator is positioned so that angular movement of the tool support effects substantially direct inward movement of its plunger by the abutment 172.

The drawings and the foregoing specification constitute a description of the improved gear finishing machine in such full, clear, concise and exact terms as to enable any person skilled in the art to practice the invention, the scope of which is indicated by the appended claims.

What I claim as my invention is:

1. A gear finishing machine comprising a work support and tool support each provided with rotary spindles, means for driving one of said spindles in rotation, means for traversing one of said spindles in a plane parallel to the axes of both of said spindles, and means for effecting relative approach between said spindles in a direction substantially perpendicular to both of said spindles, said last means comprising a carrier for one of said supports, pivot means mounting said carrier for pivotal movement about an axis parallel to a plane parallel to the axes of both of said spindles and spaced a substantial distance from the axis of the spindle carried by said one support, said pivot means being located in a position such that gravitational torque on said carrier is minimized, yieldable means connecting said carrier and one support operable to apply a relatively light controlled radial pressure between a gear and gear-like tool carried in mesh by said spindles, and clamping means between said carrier and said one support comprising a member carried by one of said carrier and said one support and having opposed surfaces generally perpendicular to the axis of said pivot mounting, a pair of levers pivoted to the other of said carrier and said one support on opposite sides of said member, actuating means connected directly between said levers, said levers having friction locking arms movable into and out of locking engagement with opposite side surfaces of said member.

2. A gear finishing machine defined in claim 1 wherein said yieldable means comprises a fluid cylinder device.

3. A gear finishing machine defined in claim 1 wherein spaced abutment means are provided on said carrier and said one support, and a movable gauge plate carried by one of said carrier and said one support for movement into and out of gauging position between said abutment means, said clamping means being effective to urge said one support in a direction to engage said gauge plate.

4. A gear finishing machine comprising a base, a work support on said base including a horizontal driving work spindle for supporting a work gear, a drive motor connected to said work spindle, a carriage on said base movable parallel to said work spindle, a tool slide on said carriage movable horizontally thereon perpendicular to said work spindle, a tool support housing mounted on said slide for angular adjustment about a horizontal axis perpendicular to the axis of said work spindle, a tool support carried by said housing and including a rotary tool spindle for mounting a gear-like tool in mesh at the side of a work gear on said work spindle, said tool support having a pivot connection to said tool support housing for pivotal movement about an axis substantially in the vertical plane through the axis of said tool spindle and spaced a substantial distance therefrom, yieldable means connecting said housing and tool support operable to urge a tool on said tool spindle into light radial pressure and mesh with a gear on said work spindle, and clamping means connected between said housing and tool support, said clamping means comprising an abutment and a pair of independently slidable wedge members engageable with opposite sides of said abutment, an actuator, and non-positive drive means connecting said actuator to both of said wedge members to advance them into wedging engagement with said abutment.

5. A gear finishing machine comprising a base, a work support on said base including a horizontal driving work spindle for supporting a work gear, a drive motor connected to said work spindle, a carriage on said base movable parallel to said work spindle, a tool slide on said carriage movable horizontally thereon perpendicular to said work spindle, a tool support housing mounted on said slide for angular adjustment about a horizontal axis perpendicular to the axis of said work spindle, a tool support carried by said housing and including a rotary tool spindle for mounting a gear-like tool in mesh at the side of a work gear on said work spindle, said tool support having a pivot connection to said tool support housing for pivotal movement about an axis substantially in the vertical plane through the axis of said tool spindle and spaced a substantial distance therefrom, yieldable means connecting said housing and tool support operable to urge a tool on said tool spindle into light radial pressure and mesh with a gear on said work spindle, and clamping means connected between said housing and tool support, said clamping means comprising an abutment and a pair of independently slidable wedge members engageable with opposite sides of said abutment, an actuator, non-positive drive means connecting said actuator to both of said wedge members to advance them into wedging engagement with said abutment, and positive acting means connecting said actuator and wedge members to retract said wedge members from said abutment.

6. A gear finishing machine comprising a work support and tool support each provided with rotary spindles, means for driving one of said spindles in rotation, means for traversing one of said spindles in a plane parallel to the axes of both of said spindles, and means for effecting relative approach between said spindles in a direction substantially perpendicular to both of said spindles, said last means comprising a carrier for one of said supports, pivot means mounting said carrier for pivotal movement about an axis parallel to a plane parallel to the axes of both of said spindles and spaced a substantial distance from the axis of the spindle carried by said one support, said pivot means being located in a position such that gravitational torque on said carrier is minimized, yieldable means connecting said carrier and one support operable to apply a relatively light controlled radial pressure between a gear and gear-like tool carried in mesh by said spindles, and clamping means between said carrier and said one support, said clamping means comprising an abutment and a pair of independently slidable wedge members engageable with opposite sides of said abutment, an actuator, and non-positive drive means connecting said actuator to both of said wedge members to advance them into wedging engagement with said abutment.

7. A gear finishing machine defined in claim 6 wherein positive acting means are provided for connecting said actuator and wedge members to retract said wedge members from said abutment.

8. A gear finishing machine defined in claim 6 wherein said yieldable means comprises a fluid cylinder device.

9. A gear finishing machine defined in claim 6 wherein spaced abutment means are provided on said carrier and said one support, and a movable gauge plate carried by one of said carrier and said one support for movement into and out of gauging position between said abutment means, said clamping means being effective to urge said one support in a direction to engage said gauge plate.

References Cited in the file of this patent

UNITED STATES PATENTS

| | | |
|---|---|---|
| 2,072,339 | Johnson | Mar. 2, 1937 |
| 2,433,468 | Mackmann et al. | Dec. 30, 1947 |
| 2,444,485 | Aitcheson | July 6, 1948 |
| 2,445,607 | De Ghetto | July 20, 1948 |
| 2,511,418 | Schulte | June 13, 1950 |
| 2,917,973 | Praeg | Dec. 22, 1959 |

FOREIGN PATENTS

| | | |
|---|---|---|
| 1,131,536 | France | Oct. 22, 1956 |